United States Patent Office 3,157,573
Patented Nov. 17, 1964

3,157,573
ANTIHYPERTENSIVE 3,4-DIHYDRO-2(1H)-ISOQUINOLINECARBOXAMIDINE
Wilhelm Wenner, Upper Montclair, N.J., assignor to Hoffmann-La Roche Inc., Nutley, N.J., a corporation of New Jersey
No Drawing. Filed Dec. 18, 1962, Ser. No. 245,426
13 Claims. (Cl. 167—55)

This invention relates to novel heterocyclic compounds, methods for preparing them and pharmaceutical compositions which have as their essential active ingredient at least one of the herein described compounds. The compounds to which this invention pertain are isoquinoline compounds bearing a susbtituent on the hetero nitrogen atom. More specifically, the compounds to which this application pertains can be denoted as 3,4-dihydro-2(1H)-isoquinoline carboxamidines or, in the alternative, 1,2,3,4-tetrahydroisoquinoline-2-carboxamidines. Thus, the compounds of the invention are selected from the group consisting of compounds of the formula

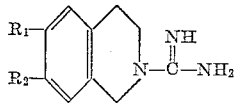

(I)

and acid addition salts thereof, wherein $R_1$ and $R_2$ are individually selected from the group consisting of hydrogen, lower alkoxy and, taken together, lower alkylenedioxy.

In the above formula, either one or both of the symbols $R_1$ and $R_2$ can represent hydrogen or one of the enumerated substituent groups, so that either an unsubstituted fused phenyl ring or a fused phenyl ring bearing one or two substituent groups can be present. Lower alkoxy is exemplified by groups such as methoxy and the like and lower alkylenedioxy is similarly exemplified by groups such as methylenedioxy and the like.

The compounds of Formula I above are basic compounds which form acid addition salts with inorganic or organic acids. Thus, they form pharmaceutically acceptable acid addition salts with both pharmaceutically acceptable organic and inorganic acids such as the hydrohalides, e.g., hydrochloride, hydrobromide, hydroiodide, hydrofluoride, other mineral acid salts such as sulfate, nitrate, phosphate and the like, alkyl- and mono-aryl sulfonates such as ethanesulfonate, toluenesulfonate, benzenesulfonate, or the like, other organic acids such as acetate, tartrate, maleate, citrate, benzoate, salicylate, ascorbate, and the like.

The compounds of Formula I above can be prepared by reacting a 1,2,3,4-tetrahydroisoquinoline of the formula

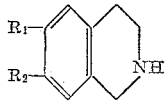

(II)

wherein $R_1$ and $R_2$ have the same meaning as above with an acid addition salt of 2-lower alkyl-2-isothiourea. By utilizing an acid addition salt of the 2-lower alkyl-2-isothiourea the product obtained is the corresponding acid addition salt of a compound of Formula I. There is no particular temperature critical to the success of this reaction and it can be conducted at room temperature or below or above room temperature. Similarly it can be conducted at atmospheric pressure or at reduced or elevated pressure. The reaction should be carried out in a medium which serves as a solvent for the reactants and any suitable conventional solvent medium can be used for this purpose, for example, the reaction can be conducted in an aqueous system, an aqueous alcoholic system, or the like aqueous system containing a water miscible solvent.

In an alternate method of preparing compounds of Formula I above a 1,2,3,4-tetrahydroisoquinoline of Formula II is reacted with an acid addition salt of 2-lower alkyl-2-pseudourea. By utilizing an acid addition salt of 2-lower alkyl-2-pseudourea, the product obtained is the corresponding acid addition salt of the compound of Formula I. There is no particular temperature critical to the success of this reaction. It can be conducted at room temperature or below or above room temperature. It can be conducted at atmospheric pressure or at reduced or elevated pressure. Suitably, it is conducted at atmospheric pressure and between about room temperature and about 100° C., preferably between about 50° C. and about 80° C. The reaction should be carried out in a medium which serves as a solvent for the reactants, and any suitable conventional solvent medium can be used for this purpose, for example, said reaction can be conducted in an aqueous system, an aqueous alcoholic system, or the like aqueous system containing a water miscible solvent.

In yet another embodiment of this invention, the compounds of Formula I above can be preparted by reacting a 1,2,3,4-tetrahydroisoquinoline of Formula II with a pyrazole-1-carboxamidine. Suitably, the process comprises reacting a compound of Formula II with an acid addition salt of 3,5-di(lower alkyl)-pyrazole-1-carboxamidine. By utilizing an acid addition salt of the pyrazole-1-carboxamidine, the product obtained is the corresponding acid addition salt of the compound of Formula I. There is no particular temperature critical to the success of this reaction. It can be conducted at room temperature or below or above room temperature. It can be conducted at atmospheric pressure or at reduced or elevated pressure. Suitably, it is conducted at atmospheric pressure and between about room temperature and about 100° C, preferably between about 70° C. and about 100° C. The reaction should be carried out in a medium which serves as a solvent for the reactants and any suitable conventional solvent medium can be used for this purpose, for example, said reaction can be conducted in an aqueous system, an aqueous alcoholic system, or the like aqueous system containing a water miscible solvent.

The compounds of Formula I and pharmaceutically acceptable acid addition salts thereof are useful as hypotensives. More specifically, the compounds of Formula I and pharmaceutically acceptable acid addition salts thereof are useful as hypotensive adrenergic blocking agents. They are especially suitable in that they exhibit a low incidence of side effects, e.g., diarrhea, common to other hypotensive adrenergic blocking agents. Moreover, they do not deplete catecholamines, e.g., epinephrine and norepinephrine. Thus, they do not deplete endogenous catecholamines from the adrenal gland or from peripheral storage sites. The compounds of Formula I and their pharmaceutically acceptable acid addition salts are also useful as inhibitors of *Trichomonas vaginalis*. This inhibition can be effected by contacting the active ingredient with the organism.

The compounds of Formula I and their pharmaceutically acceptable acid addition salts can be administered orally or parenterally with dosage adjusted to individual requirements. They can be administered therapeutically, for example, orally or parenterally by incorporating a therapeutic dosage in a conventional dosage form such as tablets, capsules, elixirs, suspensions, solutions or the like. They can be administered in mixture with conventional pharmaceutical carriers or excipients, such as, for example, corn starch, calcium stearate, magnesium carbonate, calcium silicate, dicalcium phosphate, talc, lactose, and the like. Moreover, they can be administered in the presence of buffers, or agents used to adjust to isotonicity, and the pharmaceutical dosage forms can, if desired, be subjected to conventional pharmaceutical expedients such as, for example, sterilization. As stated above, the dosage can be adjusted to individual requirements. When administered to a host to produce a hypotensive effect, the average daily dose is suitably, in higher mammals, between about 10 mg. per day and about 180 mg. per day, preferably between about 40 mg. per day and about 80 mg. per day. The dosage can be taken at one time or divided dosages can be taken at different times during the day. On a body-weight basis, in lower mammals, a dosage of about one to about five mg./kg. per day is appropriate, whereas in higher mammals lower body weight dosages suffice. The above dosages are exemplary of the average host. There can, of course, be individual cases where higher or lower dosage ranges are merited, and such are within the scope of this invention.

This application is a continuation-in-part of application Serial No. 177,719, filed March 6, 1962, now abandoned.

The following examples are illustrative but not limitative of the invention. Temperatures, unless otherwise stated, are expressed in degrees centigrade.

Example 1

13 g. of 1,2,3,4-tetrahydroisoquinoline and 17 g. of 2-ethyl-2-isothiourea hydrobromide were dissolved in ca. 50 ml. of water. A clear solution formed on shaking, and was heated to 80° for 3 hours. The resulting mixture was distilled to dryness in vacuo at 50–60°, leaving a crystallized residue which was triturated with acetone and filtered, yielding crystals which upon recrystallization from ca. 100 ml. water gave 1,2,3,4-tetrahydroisoquinoline-2-carboxamidine hydrobromide melting at 170–171° (uncorr.).

Example 2

27 g. of 1,2,3,4-tetrahydroisoquinoline was added at room temperature to a solution of 28 g. of 2-methyl-2-isothiourea sulfate in 80 ml. of water. The resulting mixture was kept at room temperature with occasional shaking. After a short period of time, methylmercaptan began to escape, and the mixture warmed up slightly. After then standing for 24 hours, crystals formed. They were filtered off and rinsed with ice cold water. Recrystallization from approximately 100 ml. of water yielded 1,2,3,4-tetrahydroisoquinoline-2-carboxamidine sulfate melting at 278–280° (uncorr.).

Another batch prepared in the same manner melted at 284–285° due to a minute difference in moisture content. Both batches prepared above analyzed correctly for $(C_{10}H_{13}N_3)_2 \cdot H_2SO_4$.

Example 3

44.85 g. of 1,2,3,4-tetrahydroisoquinoline-2-carboxamidine sulfate was disolved at room temperature in 1000 ml. water and 18.94 g. of finely ground barium hydroxide monohydrate added thereto. The resulting mixture was shaken on a shaking machine for 24 hours. The precipitated barium sulfate was filtered off, and the clear filtrate distilled to dryness in vacuo. A colorless viscous oil remained, which slowly solidified to a soft crystalline mass of the free base, 1,2,3,4-tetrahydroisoquinoline-2-carboxamidine. It was very soluble in water and in alcohols. In ether it dissolved sparingly, and in ligroin it was insoluble. When left standing exposed to the air, it took up carbon dioxide and formed the carbonate.

Example 4

10 g. of 1,2,3,4-tetrahydroisoquinoline-2-carboxamidine sulfate was dissolved in 200 ml. water on a steambath and a solution of 5.45 g. of barium chloride dihydrate in 30 ml. of water added thereto. The mixture was warmed for ½ hour, the precipitated barium sulfate filtered off and the clear filtrate distilled to dryness, leaving a practically colorless viscous residue which was dissolved in a small amount of absolute alcohol, and the resulting solution then cautiously diluted with anhydrous ether, until a slight turbidity remained. On standing for several hours, crystals formed. They were filtered off, washed with ether and dried, yielding 1,2,3,4-tetrahydroisoquinoline-2-carboxamidine hydrochloride melting at 179° (uncorr.).

Example 5

2 g. of 1,2,3,4-tetrahydroisoquinoline-2-carboxamidine sulfate was dissolved in a small amount of water. The resulting solution was cooled with ice water and an excess of sodium hydroxide added thereto. The resulting alkaline mixture was repeatedly extracted with ether and the combined ether extracts dried over potassium carbonate and filtered. Into the filtered clear solution carbon dioxide gas was introduced, causing 1,2,3,4-tetrahydroisoquinoline-2-carboxamidine carbonate to crystallize. The carbonate melted at 136–138° (uncorr.).

Example 6

10 g. of 1,2,3,4-tetrahydroisoquinoline-2-carboxamidine sulfate was slowly added to an ice cold solution of 10 g. of potassium hydroxide in 10 ml. of water. The mixture was then extracted repeatedly with ether and the resulting ether solution cautiously neutralized with nitric acid whereupon 1,2,3,4-tetrahydroisoquinoline-2-carboxamidine nitrate precipitated. It melted at 146–148° (uncorr.).

Example 7

3 g. of 6,7-dimethoxy-1,2,3,4-tetrahydroisoquinoline was dissolved in 25 ml. of methanol and a solution of 2.2 g. of 2-methyl-2-isothiourea sulfate in 15 ml. of water added thereto. The mixture was allowed to stand at room temperature for 1 day and was then warmed to 60–70° for 5 hours. The solution was then evaporated in vacuo and the solid residue triturated with absolute alcohol and filtered. The so-obtained crystals were recrystallized from 90% alcohol, yielding 6,7-dimethoxy-3,4-dihydro-2(1H)-isoquinoline carboxamidine sulfate melting at 259–261° (uncorr.).

Example 8

13.5 g. of 1,2,3,4-tetrahydroisoquinoline and 12 g. of O-methyl-pseudourea sulfate were dissolved in 100 ml. of water. After standing at room temperature for 24 hours, the solution was refluxed for 20 hours, and then cooled in ice for several hours. Crystals separated and were filtered off. The filtrate was distilled to dryness and mixture stirred with alcohol and filtered. The crystals were recrystallized from water, yielding 3,4-dihydro-2(1H)-isoquinoline carboxamidine sulfate melting at 266–268°.

Example 9

13.3 g. of 1,2,3,4-tetrahydroisoquinoline and 20 g. of 3,5-dimethyl-pyrazole-1-carboxamidine nitrate were refluxed overnight in 200 ml. of absolute alcohol. The solvent was removed by distillation in vacuo, leaving a crystalline mass. On triturating with 60 ml. of alcohol at room temperature, part of the material dissolved. The mixture was filtered and the crystals were washed with ice cold alcohol, yielding 3,4-dihydro-2(1H)-isoquinoline carboxamidine nitrate melting at 144–146°. A mixed melting point with a sample of the nitrate prepared from the sulfate made by the synthesis of Example 2 showed no depression.

Example 10

A solid pharmaceutical composition was prepared by blending the following material in the proportions by weight specified:

| | |
|---|---:|
| 3,4-dihydro-2(1H) - isoquinoline carboxamidine sulfate | 26.110 |
| Pregelatinized corn starch | 7.000 |
| Corn starch | 32.000 |
| Dicalcium phosphate | 32.875 |

The above ingredients were thoroughly blended and passed through a suitable size screen. F.D. & C. Blue dye No. 1 (.015 part) dissolved in water was used to granulate the above screened composition containing the active ingredient. The wet granulated composition was then passed through a suitable size screen, dried at 110° F., and again passed through a suitable size screen. Calcium stearate (2 parts) was then added to the mixture, the resulting composition blended well and compressed on a 5/16" flat, beveled punch, each tablet being of such size that it contained 40.000 mg. (base equivalent) of the active ingredient.

*Example 11*

A solid pharmaceutical composition was prepared by blending the following material in the proportions by weight specified:

3,4 - dihydro - 2(1H) - isoquinoline carboxamidine sulfate _____ 17.406
Pregelatinized corn starch _____ 6.667
Corn starch _____ 36.667
Dicalcium phosphate _____ 37.2597

The above ingredients were thoroughly blended and passed through a suitable size screen. F.D. & C. Blue No. 1 (0.0003 part) dissolved in water was used to granulate the screened composition containing the active ingredient. The wet granulated composition was then passed through a suitable size screen, dried at 110° F., and again passed through a suitable size screen. Calcium stearate (2 parts) was then added to the mixture, the resulting composition blended well and compressed on a 9/32" flat, beveled punch, each tablet being of such size that it contained 20.000 mg. (base equivalent) of the active ingredient.

*Example 12*

The following injectable formulations were prepared. Each ampul containing:

| Chemical Name | Ampul Size | |
|---|---|---|
| | 1 cc. | 2 cc. |
| 3,4-dihydro-2(1H)-isoquinoline-carboxamidine sulfate_____mg__ | 25.0 | 50.0 |
| Disodium hydrogen citrate_____percent__ | 0.1 | 0.1 |
| Phenol anhydrous U.S.P._____do____ | 0.45 | 0.45 |
| Sodium chloride U.S.P._____do____ | 0.4 | 0.4 |
| Disodium dihydrogen ethylene diamine tertaacetate_____percent__ | 0.01 | 0.01 |
| Injection water_____ | q.s. | q.s. |

Exemplary of the preparation of the above injectable solution is the following description of the preparation of 1 liter of solution used to fill into ampuls. The following ingredients were used:

3,4 - dihydro - 2(1H) - isoquinoline carboxamidine sulfate (with 2% excess) _____g____ 25.5
Disodium hydrogen citrate _____g____ 1.0
Phenol anhydrous, U.S.P. _____g____ 4.5
Sodium chloride, U.S.P. _____g____ 4.0
Disodium dihydrogen ethylene diamine tetraacetate _____mg____ 100.0
Injection water, qs. to 1000.0 ml.

(A similar injectable solution was prepared using in place of the disodium hydrogen citrate a mixture of 0.3 g. of citric acid U.S.P. and 0.7 g. of trisodium citrate.)

The ingredients were dissolved in about 700 cc. of injection water and the pH of the solution adjusted to 5.0±0.2 using dilute sodium hydroxide or dilute sulfuric acid as needed. The solution was then adjusted to volume and filtered through a 02 Selas candle and filled into amber ampuls under nitrogen gas.

*Example 13*

A dry solid pharmaceutical composition was prepared by blending the following materials in the proportions by weight specified:

3,4-dihydro-2(1H)-isoquinoline carboxamidine hydrobromide _____ 16.4
Corn starch _____ 43.3
Dicalcium phosphate _____ 36.5
Cacium stearate _____ 2.0

The active ingredient was blended with part of the corn startch and all the dicalcium phosphate. A corn starch paste was then made by mixing in the balance of the starch and, as in Examples 10 and 11 above, a wet granulation was prepared by granulating this paste with a dye solution. The wet granulated composition was then passed through a hammer mill and dried overnight at 110° F. The dry granules were screened through a suitable size screen and the calcium stearate added. The mixture was then blended well and tablets compressed on a 9/32" flat, beveled punch, each tablet being of such size that it contained 20 mg. (base equivalent) of active ingredient.

*Example 14*

A dry solid pharmaceutical composition was prepared by blending the following materials in the proportions by weight specified:

3,4-dihydro-2(1H)-isoquinoline carboxamidine hydrochloride _____ 14.7
Corn starch _____ 43.3
Dicalcium phosphate _____ 40.0
Calcium stearate _____ 2.0

The active ingredient was blended with part of the corn starch and all the dicalcium phosphate. A corn starch paste was then made by mixing in the balance of the starch and, as in Examples 10 and 11 above, a wet granulation was prepared by granulating this paste with a dye solution. The wet granulated composition was then passed through a hammer mill and dried overnight at 110° F. The dry granules were screened through a suitable size screen and the calcium stearate added. The mixture was then blended well and tablets compressed on a 9/32" flat, beveled punch, each tablet being of such size that it contained 20 mg. (base equivalent) of active ingredient.

*Example 15*

A dry solid pharmaceutical composition was prepared by blending the following materials in the proportions by weight specified:

3,4-dihydro-2(1H)-isoquinoline carboxamidine ____ 21
Calcium silicate (Microcel C) _____ 150
Pregelatinized corn starch _____ 29
Dicalcium phosphate _____ 50
Corn starch _____ 50
Talc, U.S.P. _____ 3
Calcium stearate _____ 3

The active ingredient was dissolved in 2B alcohol (15% w./v.) and absorbed on the calcium silicate. This was then mixed with the pregelatinized corn starch, dicalcium phosphate and corn starch. The mixture was granulated by the addition of distilled water. It was then dried at 37°, passed through a suitable size screen, blended with the talc and calcium stearate and mixed well. Tablets were compressed from the resulting mixture on a 15/32" size punch, each tablet being of such size that it contained 20 mg. of the active ingredient.

*Example 16*

A dry solid pharmaceutical composition was prepared by blending the following materials in the proportions by weight specified:

| | |
|---|---|
| 3,4-dihydro-2(1H)-isoquinoline carboxamidine | 21 |
| Magnesium carbonate | 150 |
| Pregelatinized corn starch | 29 |
| Dicalcium phosphate | 50 |
| Corn starch | 50 |
| Talc, U.S.P. | 3 |
| Calcium stearate | 3 |

The active ingredient was dissolved in 2B alcohol (15% w./v.) and absorbed on the magnesium carbonate. This was then mixed with the pregelatinized corn starch, dicalcium phosphate and corn starch. The mixture was granulated by the addition of distilled water. It was then dried at 37° C., passed through a suitable size screen, blended with the talc and calcium stearate, and mixed well. Tablets were compressed from the resulting mixture on a $^{15}\!/_{32}''$ size punch, each tablet being of such size that it contained 20 mg. of the active ingredient.

I claim:
1. The process of producing a hypotensive effect which comprises administering to a host a compound selected from the group consisting of compounds of the formula

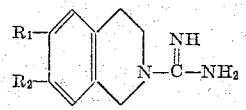

and pharmaceutically acceptable acid addition salts thereof
wherein $R_1$ and $R_2$ are individually selected from the group consisting of hydrogen, lower alkoxy, and, taken together, lower alkylenedioxy.

2. The process of claim 1 wherein the compound administered is 3,4-dihydro-2(1H)-isoquinoline carboxamidine.

3. The process of claim 1 wherein the compound administered is 3,4-dihydro-2(1H)-isoquinoline carboxamidine sulfate.

4. A pharmaceutical composition comprising from about 1 mg. to about 180 mg. of an active ingredient selected from the group consisting of compounds of the formula

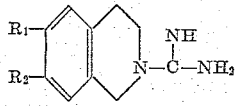

and pharmaceutically acceptable acid addition salts thereof
wherein $R_1$ and $R_2$ are individually selected from the group consisting of hydrogen, lower alkoxy, and, taken together, lower alkylenedioxy,
and a pharmaceutical carrier.

5. A pharmaceutical composition as in claim 4 wherein from about 10 mg. to about 180 mg. of the active ingredient is present.

6. A pharmaceutical composition as in claim 4 wherein from about 10 mg. to about 80 mg. of the active ingredient is present.

7. A pharmaceutical composition as in claim 4 wherein from about 10 mg. to about 40 mg. of the active ingredient is present.

8. A pharmaceutical composition comprising from about 1 mg. to about 180 mg. of an active ingredient selected from the group consisting of 3,4-dihydro-2(1H)-isoquinoline carboxamidine and pharmaceutically acceptable acid addition salts thereof, and a pharmaceutical carrier.

9. A pharmaceutical composition comprising from about 1 mg. to about 180 mg. base equivalent weight of 3,4-dihydro-2(1H)-isoquinoline carboxamidine sulfate and a pharmaceutical carrier.

10. A pharmaceutical composition as in claim 8, in tablet form, comprising in each tablet about 20 mg. base equivalent weight of 3,4-dihydro-2(1H)-isoquinoline carboxamidine sulfate.

11. A pharmaceutical composition as in claim 8, in tablet form, comprising in each tablet about 40 mg. base equivalent weight of 3,4-dihydro-2(1H)-isoquinoline carboxamidine sulfate.

12. A pharmaceutical composition comprising about 10 mg. base equivalent weight of 3,4-dihydro-2(1H)-isoquinoline carboxamidine sulfate and a pharmaceutical carrier.

13. A pharmaceutical composition adapted for oral administration comprising from about 1 mg. to about 180 mg. of an active ingredient selected from the group consisting of 3,4-dihydro-2(1H)-isoquinoline carboxamidine and pharmaceutically acceptable acid addition salts thereof, and a pharmaceutical carrier.

References Cited in the file of this patent
UNITED STATES PATENTS

| | | |
|---|---|---|
| 2,719,158 | Druey | Sept. 27, 1955 |
| 2,798,070 | Cain | July 2, 1957 |
| 2,876,229 | Bloom | Mar. 3, 1959 |
| 2,951,843 | Haack et al. | Sept. 6, 1960 |
| 2,955,073 | De Beer | Oct. 4, 1960 |
| 2,986,573 | Topliss et al. | May 30, 1961 |
| 3,026,247 | Hill | Mar. 20, 1962 |
| 3,034,960 | Scott | May 15, 1962 |

UNITED STATES PATENT OFFICE
CERTIFICATE OF CORRECTION

Patent No. 3,157,573                  November 17, 1964

Wilhelm Wenner

It is hereby certified that error appears in the above numbered patent requiring correction and that the said Letters Patent should read as corrected below.

Column 6, line 13, for "Cacium" read -- Calcium --; column 7, lines 45 to 50, the formula should appear as shown below instead of as in the patent:

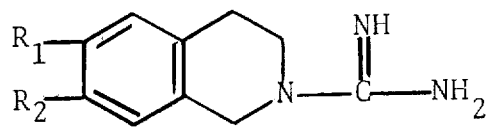

Signed and sealed this 18th day of January 1966.

(SEAL)
Attest:

ERNEST W. SWIDER                  EDWARD J. BRENNER
Attesting Officer                     Commissioner of Patents